United States Patent [19]
Bartoe, Jr.

[11] 3,807,663
[45] Apr. 30, 1974

[54] AIR FOIL STRUCTURE

[75] Inventor: Otto E. Bartoe, Jr., Boulder, Colo.

[73] Assignee: Ball Brothers Research Corporation, Boulder, Colo.

[22] Filed: Sept. 15, 1972

[21] Appl. No.: 289,406

[52] U.S. Cl. .......................................... 244/42 CC
[51] Int. Cl. ............................................. B64c 21/04
[58] Field of Search ............ 244/42 R, 42 D, 42 DA, 244/42 E, 42 CA, 42 CB, 42 CC, 40 R, 41

[56] References Cited
UNITED STATES PATENTS

| | | | |
|---|---|---|---|
| 2,809,793 | 10/1957 | Warner............................ | 244/42 CC |
| 3,442,470 | 5/1969 | Farbridge et al................ | 244/42 DA |
| 1,874,278 | 8/1932 | Gaines............................. | 244/42 C |
| 2,868,479 | 1/1959 | Kadosch et al.................. | 244/42 CC |
| 1,491,954 | 4/1924 | Jacobs............................. | 244/42 CC |
| 2,441,694 | 5/1948 | Ehrhardt.......................... | 244/40 R |
| 2,700,516 | 1/1955 | Nazir................................ | 244/42 R |
| 1,580,577 | 4/1926 | Baumann.......................... | 244/42 CC |
| 2,064,970 | 12/1936 | Dornier............................ | 244/42 R |
| 2,541,704 | 2/1951 | Koppen............................ | 244/40 R |

*Primary Examiner*—George E. A. Halvosa
*Assistant Examiner*—Edward R. Kazenske
*Attorney, Agent, or Firm*—James D. Haynes

[57] ABSTRACT

A powered air foil structure particularly adapted for use during low speed operation associated with take off and landing of an air craft and an air foil therefor. The air foil comprises an upper surface including first and second portions, the trailing edge of said first portion being vertically spaced above the leading edge of said second portion by an amount equal to approximately 0.03 to 0.20 times the chord of said air foil, the trailing edge of said first portion being disposed rearwardly from the leading edge of said air foil by an amount equal to approximately 0.20 to 0.33 times the chord of said air foil, said spaced apart trailing edge of said first portion and the leading edge of said second portion forming a nozzle for directing gas rearwardly of said air foil and across substantially the entire upper surface of the air foil disposed rearwardly of said nozzle, said nozzle extending in a generally spanwise direction of said air foil, and means for supplying pressurized gas to said nozzle. One shown air foil structure includes said air foil in combination with an augmentor air foil which is disposed rearwardly of the trailing edge of the first portion of said air foil and vertically spaced thereabove for the purpose of entrapping or incorporating ambient air within the gas exiting from said nozzle. The air foil structure may also include said air foil having a flap extending spanwise adjacent the trailing edge thereof and a deflector air foil for directing at least a portion of the ambient air-gas mixture across the upper surface of said flap and downwardly of the trailing edge thereof. The method of this invention involves the steps of directing gas rearwardly of said air foil from a spanwise extending nozzle disposed along a line located rearwardly from the leading edge of said air foil by an amount equal to approximately 0.20 to 0.33 times the chord of said air foil and having an opening the height of which is equal to approximately 0.03 to 0.20 times the chord of said air foil wherein said gas is directed across substantially the entire upper surface of the air foil disposed rearwardly of said spanwise extending nozzle, entrapping ambient air within the gas directed rearwardly of said nozzle and across the upper surface of said air foil downstream of said spanwise extending nozzle and directing at least a portion of said ambient air-gas mixture across the upper surface of said flap and downwardly of the trailing edge thereof. The method of this invention also comprises pressurizing a gas, supplying said pressurized gas to the interior of said air foil, and directing gas rearwardly of said air foil from a spanwise extending nozzle disposed along a line located rearwardly from the leading edge of said air foil by an amount equal to approximately 0.20 to 0.33 times the chord of said air foil and having an opening the height of which is equal to approximately 0.03 to 0.20 times the chord of said air foil wherein said gas is directed across substantially the entire upper surface of the air foil disposed rearwardly of said nozzle.

3 Claims, 4 Drawing Figures

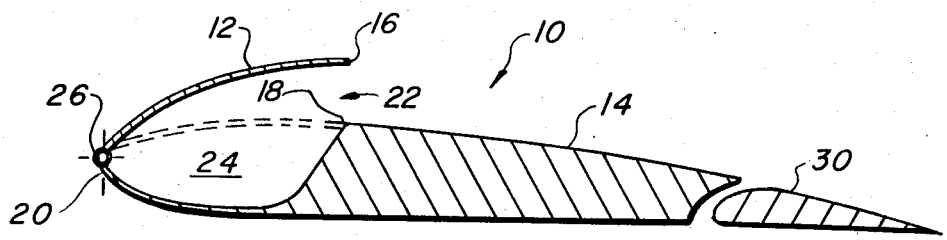
Fig_1
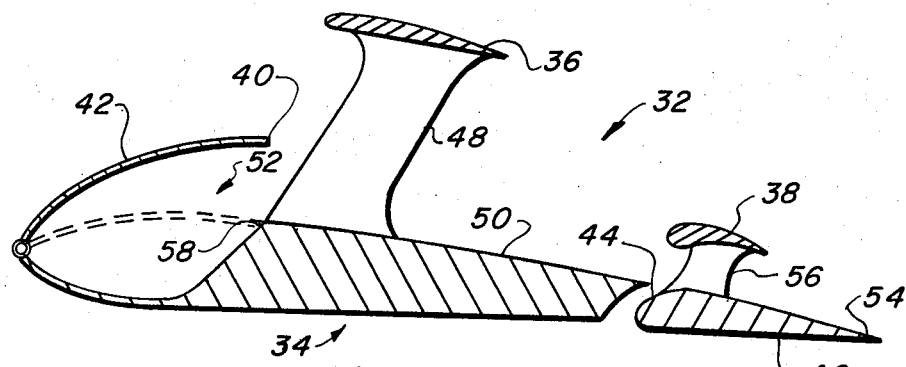
Fig_2
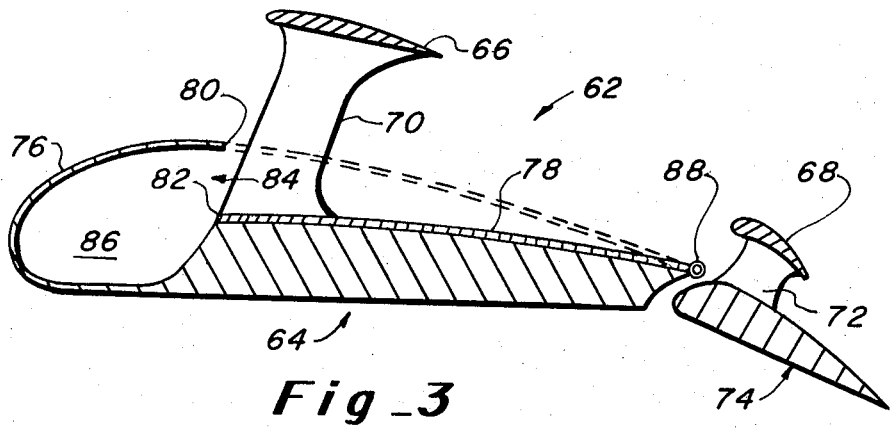
Fig_3

AIR FOIL STRUCTURE

BACKGROUND OF THE INVENTION

Heretofore, various proposals have been made and attempts undertaken for the purpose of utilizing a propulsive jet to increase the performance of an air foil during low speed operation such as associated with the take off and landing of an air craft. Gas has been directed across portions of the upper surface of an air foil, primarily across the flap associated with said air foil, for the purpose of increasing the amount of lift available from said air foil. Gas, normally in small amounts, has also been directed across portions of the upper surface of an air foil for the purpose of preventing separation of the air flowing across the trailing portion of said air foil. None of such efforts affected materially the propulsive efficiency nor did they provide thrust for forward motion of the aircraft. Some of the prior art proposals and attempts have adversely affected the overall stability of the aircraft by changing materially the trim thereof during low speed operations. Further, some of the prior art proposals contributed to an aggravation of the generated noise level rather than minimizing or reducing same. It has been discovered, however, that each of the aforementioned problems may be overcome through the use of the method of this invention for powering an air foil structure and an air foil structure therefor.

SUMMARY OF THE INVENTION

This invention relates to a method of powering an air foil structure and an air foil therefor involving the use of a propulsive jet in a manner to derive simultaneously both lift and thrust with a high propulsive efficiency particularly during low speed operations associated with the take off and landing of an aircraft. At the same time, the generated noise level associated with the operation of an air foil structure constructed in accordance with this invention will be reduced. Finally, the method and air foil structure of this invention permits the application of lift and thrust forces in a manner so as to maintain good stability and control of the aircraft particularly at low speed operations thereof.

The air foil of this invention comprises an upper surface including first and second portions, the trailing edge of said first portion being vertically spaced above the leading edge of said second portion by an amount equal to approximately 0.03 to 0.20 times the chord of said air foil, the trailing edge of said first portion being disposed rearwardly from the leading edge of said air foil by an amount equal to approximately 0.20 to 0.33 times the chord of said air foil, a nozzle formed by the spaced apart trailing edge of the first portion and the leading edge of said second portion for directing gas rearwardly of said air foil and across the upper surface of the air foil disposed rearwardly of said nozzle, said nozzle extending in a generally spanwise direction of said air foil, and means for supplying pressurized gas to said nozzle. The air foil structure of this invention comprises the air foil as aforedescribed, which air foil may also include a flap, an augmentor air foil disposed intermediate the trailing edge of said first portion of said air foil and the leading edge of said flap of said air foil, said augmentor air foil being disposed vertically above the upper surface of said second portion by an amount equal to at least approximately 0.3 times the chord of said augmentor air foil but not less than approximately 1.5 times the vertical distance separating the trailing edge of said first portion and the leading edge of said second portion, and/or a deflector air foil for directing at least a portion of the pressurized gas exiting from said nozzle across the upper surface of said flap and downwardly off the trailing edge thereof, said deflector air foil being disposed adjacent the leading edge of said flap and vertically spaced thereabove by an amount equalling at least approximately 0.2 times the chord of said flap. The method of this invention involves powering through air an air foil having a flap and comprises the steps of directing gas rearwardly of said air foil from a spanwise extending nozzle disposed along a line located rearwardly from the leading edge of said air foil by an amount equal to approximately 0.20 to 0.33 times the chord of said air foil and having an opening the height of which is equal to approximately 0.03 to 0.20 times the chord of said air foil wherein said gas is directed across that portion of the upper surface of the air foil disposed rearwardly of said spanwise extending nozzle, entrapping ambient air within the gas directed rearwardly from said nozzle and across the upper surface of said air foil downstream of said spanwise extending nozzle, and directing at least a portion of said ambient air-gas mixture across the upper surface of said flap and downwardly of the trailing edge thereof. The method of this invention also involves powering an air foil through air comprising the steps of pressurizing a gas, supplying said pressurized gas to the interior of said air foil, and directing said gas rearwardly of said air foil from a spanwise extending nozzle disposed along a line located rearwardly from the leading edge of said air foil by an amount equal to approximately 0.20 to 0.33 times the chord of said air foil and having an opening the height of which is equal to approximately 0.03 to 0.20 times the chord of said air foil wherein said gas is directed across the upper surface of the air foil disposed rearwardly of said spanwise extending nozzle.

An object of this invention is to provide a unique method for powering an air foil through air through the use of a propulsive jet by directing said propulsive jet in a manner so as to derive both lift and propulsive forces particularly during low speed operation of said air foil such as between approximately 15 to 70 miles per hour.

Another object of this invention is to provide an air foil particularly adapted for use during low speed operations associated with the take off and landing of an air craft which operates at a reduced noise level.

Another object of this invention is to provide an air foil as aforesaid in which one of the first portions thereof is pivotally movable about a spanwise extending axis between a first position in which the trailing edge of said first position is disposed vertically spaced above the leading edge of said second portion and a second position whereby the trailing edge of said first position forms with the leading edge of said second portion a generally smooth contoured upper surface for said air foil and at positions intermediate said first and second positions thereby rendering said air foil for use during both low speed and high speed operations.

Further objects, advantages, and salient features of this invention will become more apparent from the detailed description to follow, the appended claims, and the accompanying drawings to be now briefly described.

BRIEF DESCRIPTION OF THE DRAWINGS

FIG. 1 is a cross-sectional view of a preferred air foil constructed in accordance with this invention;

FIG. 2 is a cross-sectional view of a modification of an air foil constructed in accordance with this invention;

FIG. 3 is a cross-sectional view of a further modification of an air foil structure constructed in accordance with this invention.

DESCRIPTION OF THE PREFERRED EMBODIMENTS

Figure 4:
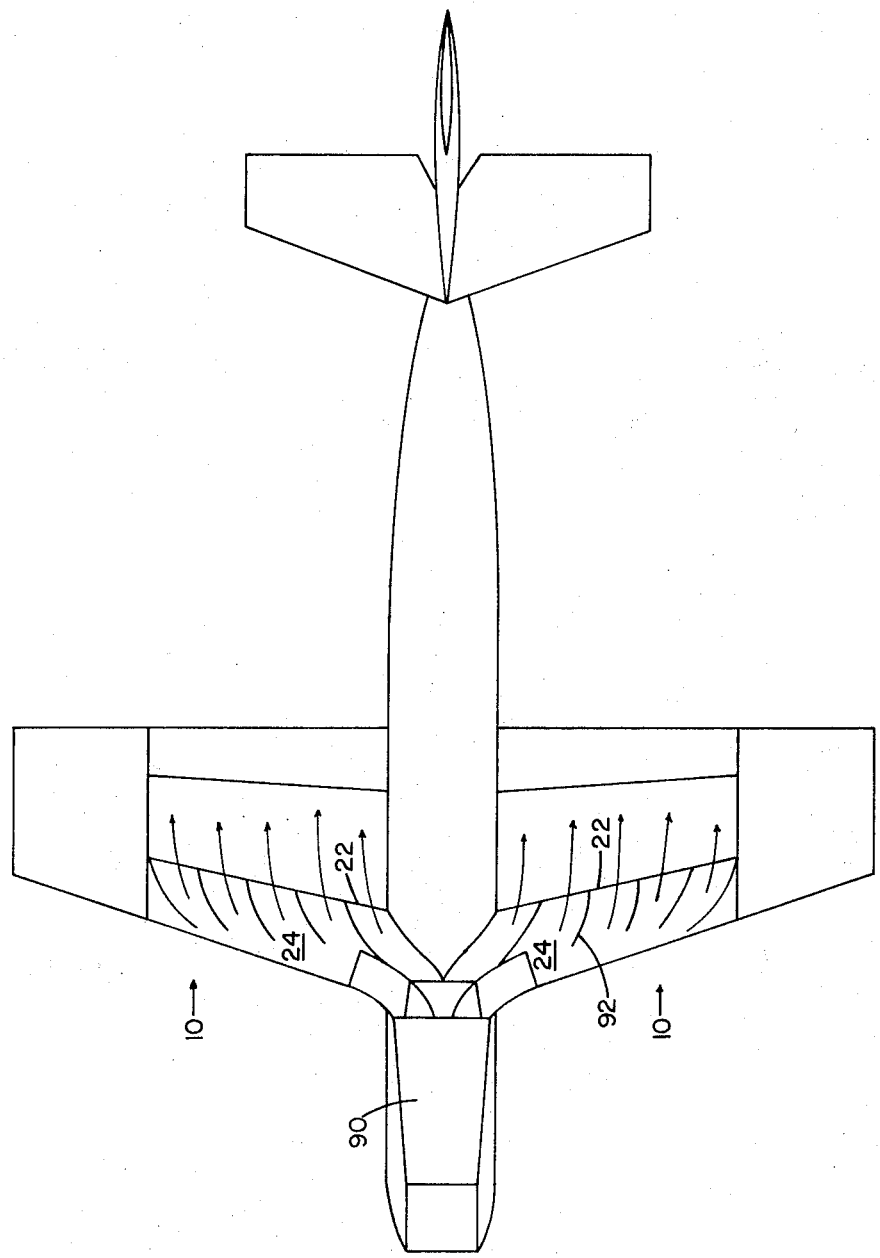
FIG. 4 is a schematic view, partly in cross-section, disclosing the means for supplying pressurized gas to the air foil structure.

Referring now to the drawing, in FIG. 1 is shown an air foil 10 constructed in accordance with this invention. The air foil 10 comprises an upper surface including a first portion 12 and a second portion 14. The first portion 12 has a trailing edge 16 vertically spaced above the leading edge 18 of the second portion by an amount equal, at maximum opening, of approximately 0.03 to 0.20 times the chord of said air foil 10. The trailing edge 16 of the first portion 12 is disposed rearwardly of the leading edge 20 of the air foil 10 by an amount equal to approximately 0.20 to 0.33 times the chord of the air foil 10. The air foil 10 includes a spanwise extending nozzle 22 the upper part of which is formed by the trailing edge 16 of the first portion 12 and the lower part of which is formed by the leading edge of the second portion 14. Nozzle 22 extends spanwise for a distance within the range of at least five times the maximum vertical distance between trailing edge 16 and leading edge 18 up to full span. The nozzle 22, as illustrated in FIG. 1, is formed to direct pressurized gas, that is received within the fluid passage 24 formed internally in the forward part of the air foil 10, rearwardly of said air foil and across substantially the entire upper surface of the air foil disposed rearwardly of said nozzle 22. The fluid passageway 24 likewise extends spanwise of said air foil 10 and is connected to any suitable means for supplying pressurized gas to said passageway such as the exhaust of a jet engine 90 (FIG. 4) or a suitable blower which may be directed to passageway 24 through suitable conduits. Referring to FIG. 4, jet engine 90 of the by-pass type provides, pressurized air to each side of the aircraft for discharge over the air foils through nozzle 22. With a straight non-tapered wing the distribution would be approximately equal all along the semi-span. The nozzle 22 is positioned to direct gas along the upper surface of the air foil disposed rearwardly thereof. Although it is preferred that the length of the nozzle be as large as possible, beneficial results are obtained even when the length of the nozzle is less than the spanwise length of the air foil.

As shown in FIG. 1, the first portion 12 of the air foil 10 is mounted for pivotal movement about a spanwise extending axis 26 disposed adjacent the leading edge 20 of the air foil 10 between a first position, in which said first portion is disposed vertically spaced above the leading edge of said second portion 14, and a second position, shown in dotted lines in FIG. 1, whereby the trailing edge 16 of said first portion forms with the leading edge 18 of said second portion a generally smooth contoured upper surface for said air foil 10. It will also be understood that said first portion 12 may also be disposed at positions intermediate said first and second positions and that suitable means (not shown) may be used to control such positioning in response to the speed of the air foil through the air. The height of the opening of the nozzle will be increased for reduced speeds of the air foil through the air and decreased for increased speeds of the air foil through the air. As shown in FIG. 1, the air foil 10 includes a flap 30, which may be any type of flap presently in common use with air foils.

It will be understood that for low speed operations, the air foil 10 will normally be operated with the first portion 12 disposed in the manner illustrated in FIG. 1, i.e., with the trailing edge 16 thereof being vertically spaced above the leading edge 18 of the second portion 14. However, as indicated above, for increased speeds of operation associated with the use of the air foil 10, the first portion 12 may be moved from its first position toward its second position and, at or above a predetermined speed, the air foil 10 will perform in the normal manner when said first portion is disposed in said second position.

In FIG. 2 is shown a powered air foil structure 32 constructed in accordance with this invention. The air foil structure 32 includes a primary air foil 34 similar in construction to air foil 10. The air foil structure 32 also comprises an augmentor air foil 36 and a deflector air foil 38. The augmentor air foil 36 is disposed intermediate the trailing edge 40 of the first portion 42 and the leading edge 44 of the flap 46 and is mounted on a plurality of supports 48. The augmentor air foil 36 is disposed vertically spaced above the upper surface of the second portion 50 of the air foil 34 by an amount equal to approximately 0.3 times the chord of said augmentor air foil but not less than approximately 1.5 times the height of the nozzle 52. The augmentor air foil 36 extends in a generally spanwise direction of said air foil 34 by an amount equal approximately to the length of said nozzle 52.

The augmentor air foil 36 has for its purpose to entrap or incorporate ambient air within the gas exiting from the nozzle 52. As such, the augmentor air foil 36 effectively serves to increase, as far as the air foil 34 is concerned, the effective cross-sectional area of the jet flow. As a result, this produces a reduction in velocity of the gas exiting across the air foil and thereby increases the overall propulsive efficiency over that which would otherwise be available from the air foil 34 in the absence of the use of the augmentor air foil 36.

The deflector air foil 38 of air foil structure 32 has for its purpose to direct gas jet across the upper surface of the flap 46 and downwardly off the trailing edge 54 of said flap. The deflector air foil 38 is mounted on a plurality of supports 56 and is disposed adjacent the leading edge of the flap 46 and vertically spaced thereabove by an amount equalling at least approximately 0.2 times the chord of the flap 46. The direction of the ambient air-gas in the manner as aforesaid by the deflector air foil also serves to prevent flow separation of air from the upper surface of the flap 46.

The amount of noise generated through the use of a propulsive jet to power an air foil is dependent, in part, upon the velocity of the gases of said jet and the size and configuration of the orifice through which the jet must travel. The use of an augmentor air foil 36 effectively increases the cross-sectional area of the jet, it being understood that the entrapment or incorporation of ambient air within the gas exiting through the nozzle 52 reduces the overall velocity of said gases. Since the intermixing of the ambient air with the gas exiting through the nozzle 52 occurs above the upper surface of the air foil 34 downstream of the leading edge 58 of the second portion 50 and upstream of the leading edge 44 of the flap 46 it will be readily appreciated that the noise level generated by the air foil 34 in combination with the augmentor air foil 36 will be less than that obtainable where the air foil 34 is used in the absence of the augmentor air foil 36.

In FIG. 3 is shown another modification of an air foil structure 62 constructed in accordance with the subject invention. The air foil structure 62 comprises a primary air foil 64, an augmentor air foil 66 and a deflector air foil 68. The augmentor air foil and the deflector air foil are each mounted on a plurality of supports 70 and 72. The primary air foil includes a flap 74. The primary air foil 64 includes upper and lower surfaces merging into leading and trailing edges. The upper surface includes a first portion 76 and a second portion 78. The first portion 76 includes a trailing edge 80 which is disposed vertically spaced above the leading edge 82 of the second portion by an amount equal to approximately 0.03 to 0.20 times the chord of said air foil 64. The trailing edge 80 of the first portion is disposed rearwardly from the leading edge of said air foil 64 by an amount equal to approximately 0.2 to 0.33 times the chord of said air foil 64. The primary air foil 64 includes a nozzle 84 formed by the spaced apart trailing edge 80 of the first portion 76 and the leading edge 82 of the second portion 78. The nozzle 84 directs gas rearwardly of said air foil and across substantially the upper surface of the air foil disposed rearwardly of the nozzle. The nozzle 84 extends in a spanwise direction of the air foil 64. Pressurized gas is supplied by any suitable means to a chamber or cavity 86 formed within the primary air foil 64. The second portion 78 of the upper surface of the primary air foil 64 is mounted for pivotal movement about a spanwise extending axis 88 from a first position as shown in FIG. 3 in which the trailing edge 80 of the first portion 76 is disposed vertically spaced above the leading edge 82 of the second portion 78 to a second position, shown in dotted lines, whereby the trailing edge 80 of the first portion 76 forms with the leading edge 82 of the second portion 78 a generally smooth contoured upper surface for said air foil. Said second portion may also be disposed at any one of various positions intermediate said first and second positions. It is to be understood that each of the structures shown in the figures also includes means (not shown) for effecting pivotal movement of the movable portion of the upper surface of each of the air foils shown therein.

The air foil structures of this invention and the air foils thereof have useful application at low velocities such as from 15 to 70 miles per hour and are particularly useful for STOL (short take off landing) air craft.

In view of the foregoing, it will be understood that a novel method of powering an air foil through air is achieved by pressurizing a gas, supplying said pressurized gas to the interior of said air foil, and directing the gas rearwardly of said air foil from a spanwise extending nozzle disposed along a line located rearwardly from the leading edge of said air foil by an amount equal to approximately 0.20 to 0.33 times the chord of said air foil and having an opening the height of which is equal to approximately 0.03 to 0.20 times the chord of said air foil wherein said gas is directed across substantially the entire upper surface of the air foil disposed rearwardly of said nozzle. It will also be understood that a novel method of powering through air an air foil having a flap is achieved by directing gas rearwardly of said air foil from a spanwise extending nozzle located rearwardly of the leading edge of said air foil as described above whereby said gas is directed across the upper surface of the air foil disposed rearwardly of the spanwise extending nozzle, then entrapping or incorporating ambient air within the gas flowing rearwardly across the upper surface of the air foil downstream of the spanwise extending nozzle thereby decreasing the relative velocity of the ambient air-gas across the upper surface of the air foil, and then directing at least a portion of the ambient air-gas mixture across the upper surface of the flap and downwardly off the trailing edge thereof. The method of this invention not only increases the lift available from an air foil structure but also achieves a greater propulsive efficiency than methods employing high speed jets. Further, the noise level generated by the practice of the method of this invention will be less than that heretofore achieved with prior art air foils. Finally, the practice of the method of this invention and the operation of the air foil structure thereof can be accomplished while obtaining good stability and maintaining desired control since the developed lift and thrust forces applied or react onto the air craft in the proper place.

Obviously, many modifications and variations of the present invention are possible in light of the above teachings, and it is therefore intended to be understood that within the scope of the appended claims the invention may be practiced otherwise than as specifically described herein.

I claim:

1. A powered air foil structure to be presented to a flow of air, said structure being particularly adapted for use during low speed operation associated with the take off and landing of an air craft, said structure comprising:

a. a primary air foil including
  i. upper and lower surfaces merging into leading and trailing edges,
  ii. the upper surface including first and second portions, each said portion having a leading and a trailing edge, the trailing edge of said first portion being vertically spaced above the leading edge of said second portion by an amount equal to approximately 0.03 to 0.20 times the chord of said air foil and the trailing edge of said first portion being disposed rearwardly from the leading edge of said air foil by an amount equal to approximately 0.20 to 0.33 times the chord of said air foil,
  iii. said spaced-apart trailing edge of said first portion and the leading edge of said second portion forming a nozzle for directing gas rearwardly of said air foil across substantially the entire upper surface of the air foil disposed rearwardly of said nozzle, said nozzle extending in a generally spanwise direction of said air foil, iv. said lower surface being a continuous solid sheet of material extending between said leading and said trailing edges;

b. a flap attached to the trailing edge of said air foil;

c. means for supplying pressurized gas to said nozzle to provide a large slow speed jet across said upper surface; and d. an augmentor air foil having a leading edge and said augmentor disposed intermediate the trailing edge of said first portion and the leading edge of said flap, said augmentor air foil being disposed vertically spaced above the upper surface of said second portion by an amount equal to at least approximately 0.3 times the chord of said augmentor air foil but not less than approximately 1.5 times the vertical distance separating the trailing edge of said first portion and the leading edge of said second portion and the leading edge of said augmentor being in approximate vertical alignment with the trailing edge of said first portion whereby ambient air is guided into the slow speed flow from said nozzle to thus reduce the velocity of said flow and increase the propulsive efficiency of said air foil.

2. A powered air foil structure as described in claim 1 above including a deflector air foil for directing at least a portion of the gas exiting from said nozzle across the upper surface of said flap and downwardly off the trailing edge thereof, said deflector air foil being disposed adjacent the leading edge of said flap and vertically spaced thereabove by an amount equalling at least approximately 0.2 times the chord of said flap.

3. A powered air foil structure as described in claim 1 in which said augmentor air foil extends in a generally spanwise direction of said air foil and generally coincidental with said nozzle.

* * * * *